(No Model.) 5 Sheets—Sheet 2.
T. R. MORGAN, Sr., J. R. MORGAN, T. R. MORGAN, Jr. & W. H. MORGAN.
MORTAR MOUNTING.

No. 479,764. Patented July 26, 1892.

(No Model.) 5 Sheets—Sheet 4.

T. R. MORGAN, Sr., J. R. MORGAN, T. R. MORGAN, Jr. & W. H. MORGAN.
MORTAR MOUNTING.

No. 479,764. Patented July 26, 1892.

(No Model.) 5 Sheets—Sheet 5.
T. R. MORGAN, Sr., J. R. MORGAN, T. R. MORGAN, Jr. & W. H. MORGAN.
MORTAR MOUNTING.
No. 479,764. Patented July 26, 1892.
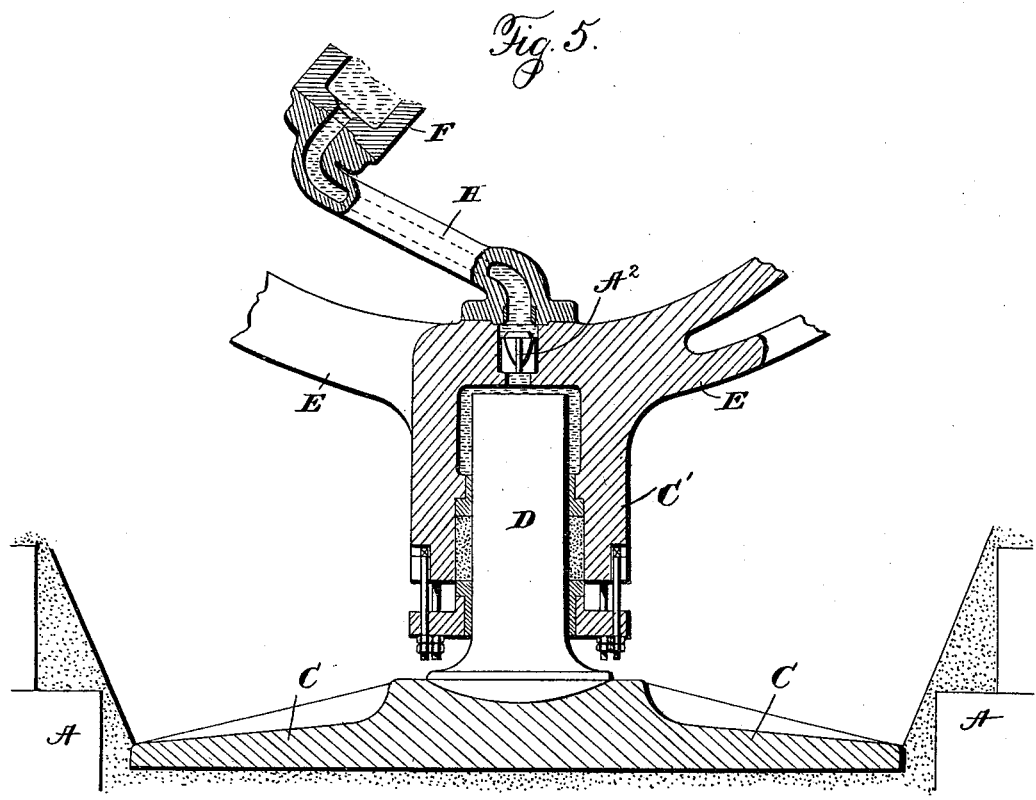

United States Patent Office.

THOMAS R. MORGAN, SR., JOHN R. MORGAN, THOMAS R. MORGAN, JR., AND WILLIAM H. MORGAN, OF ALLIANCE, OHIO.

MORTAR-MOUNTING.

SPECIFICATION forming part of Letters Patent No. 479,764, dated July 26, 1892.

Application filed June 23, 1891. Serial No. 397,212. (No model.)

*To all whom it may concern:*

Be it known that we, THOMAS R. MORGAN, Sr., JOHN R. MORGAN, THOMAS R. MORGAN, Jr., and WILLIAM H. MORGAN, of Alliance, in the county of Stark and State of Ohio, have invented certain new and useful Improvements in Mortar-Mountings; and we do hereby declare the following to be a full, clear, and exact description of the invention, such as will enable others skilled in the art to which it appertains to make and use the same.

This invention relates to mortar-mountings, the object being to store the energy of the recoil in hydraulic cylinders or accumulators and utilize the weight of the carriage to restore the gun to its forward position or to the position it occupied before firing.

A further object is to provide a fluid support or bearing for the carriage, thus dispensing altogether with conical rollers heretofore employed for this purpose.

With these ends in view our invention consists in the parts and combinations of parts, as will be more fully described, and pointed out in the claims.

Figure 1:
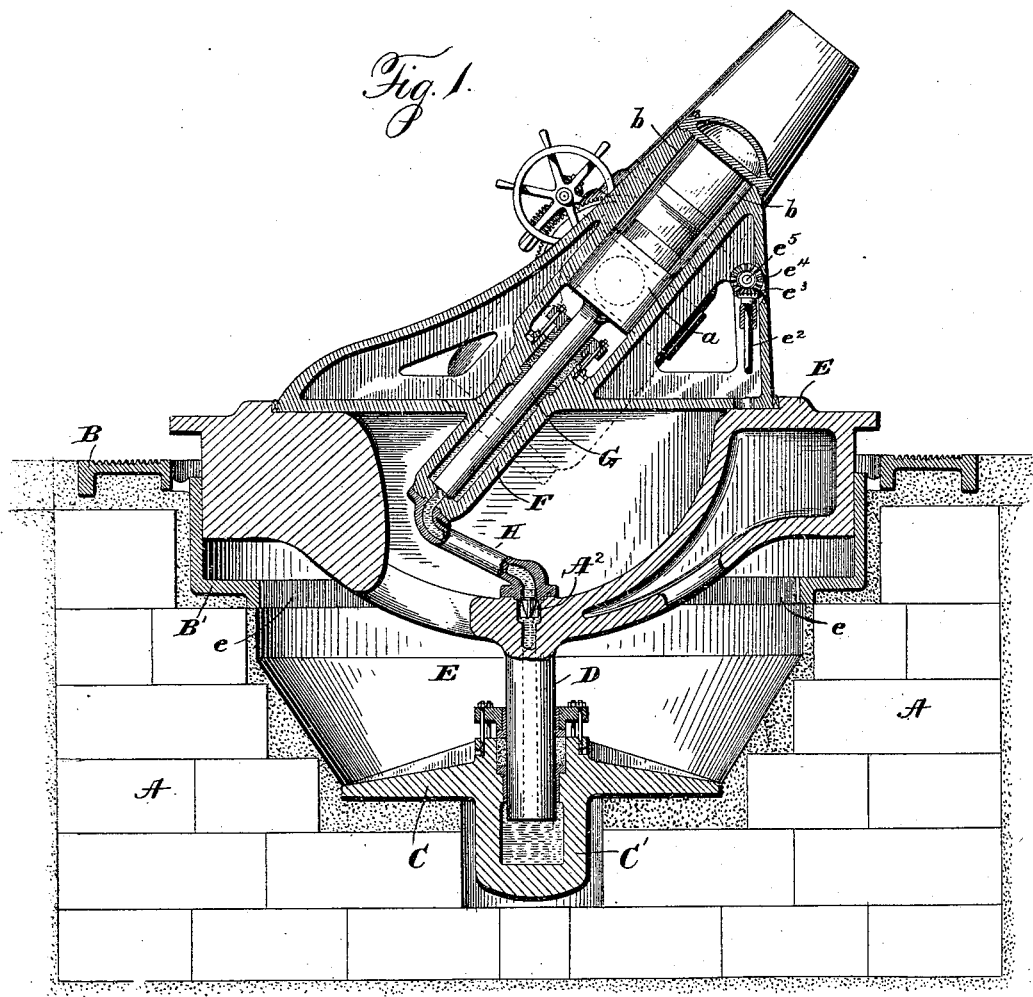
Figure 2:
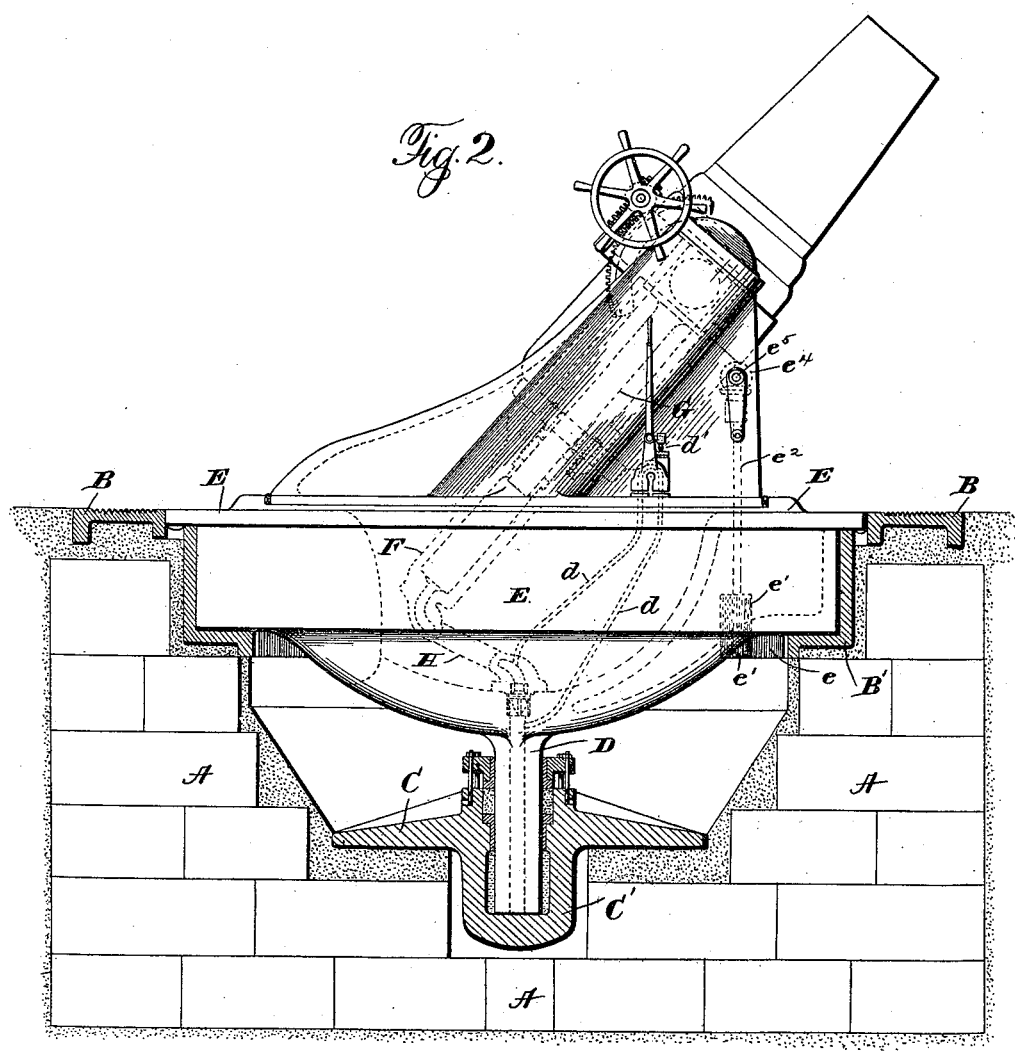
Figure 3:
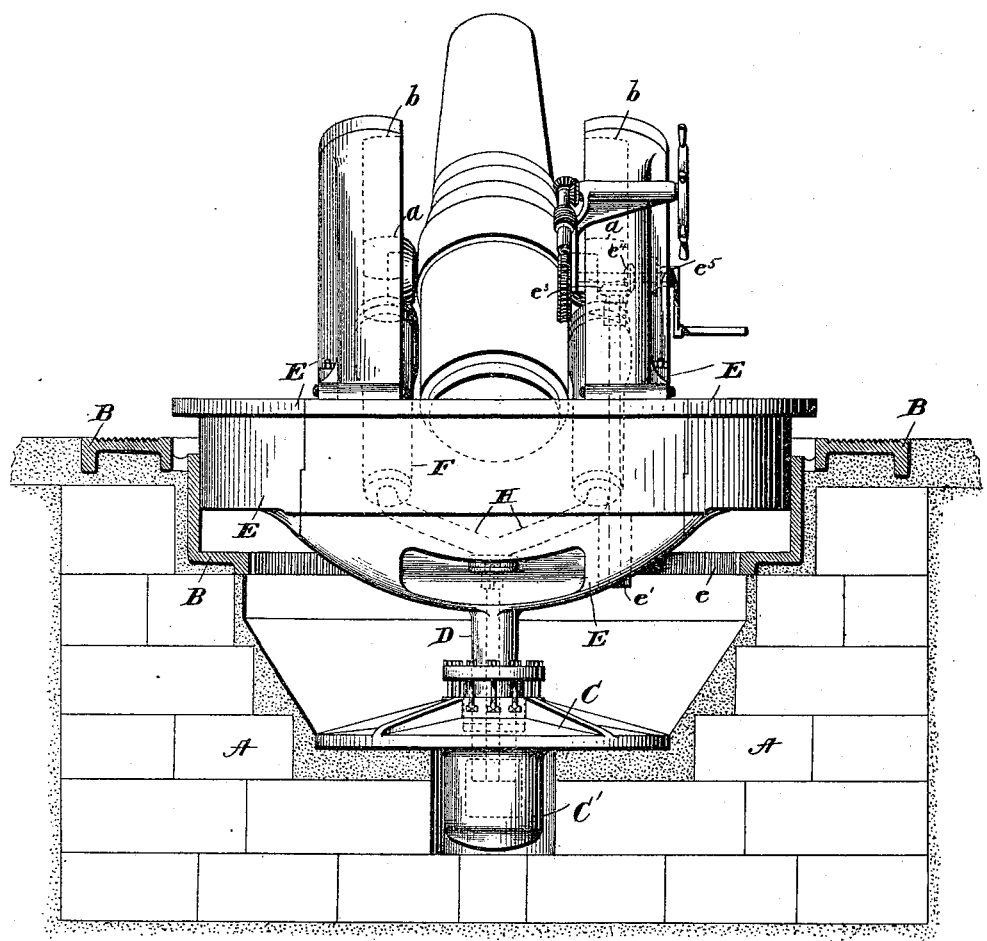
Figure 4:
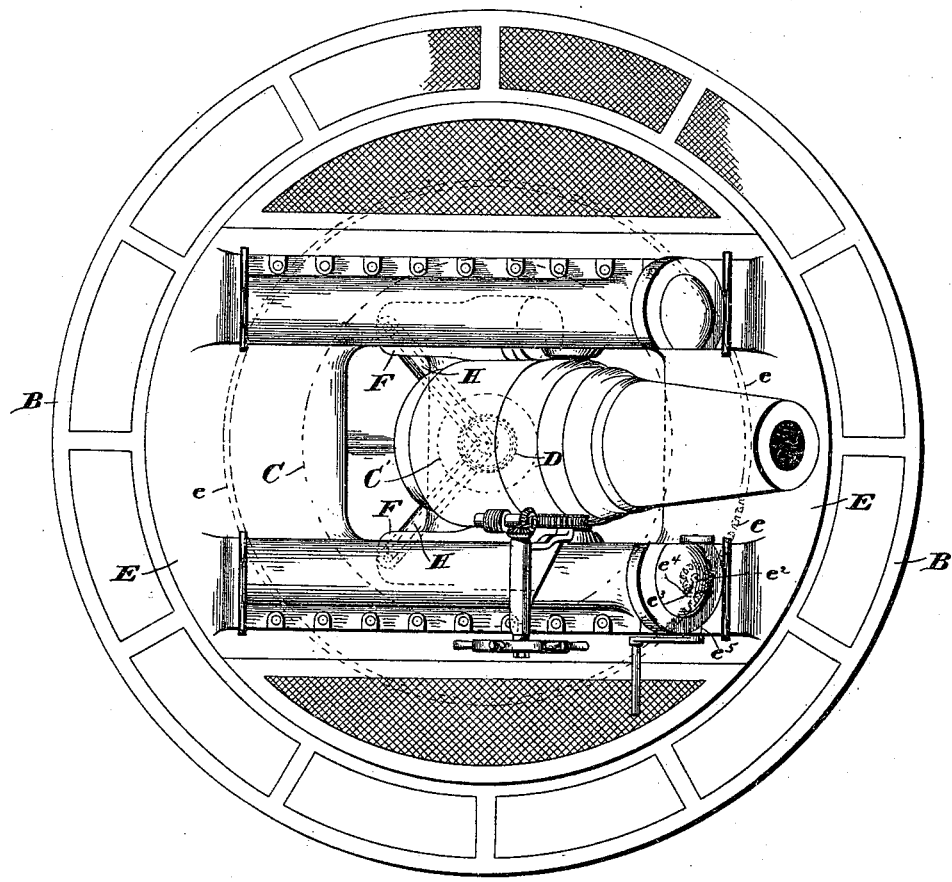

In the accompanying drawings, Figure 1 is a view in section through the foundation, carriage, and trunnion-carriage support, some of the parts being in elevation, showing the position of the gun and carriage after firing. Fig. 2 is a similar view showing the position of the parts before firing. Fig. 3 is a rear view of the gun and carriage, the foundation or base being in section. Fig. 4 is a plan view, and Fig. 5 is a view of a modified form of the accumulator and plunger.

A represents a foundation or base constructed of masonry or any suitable material and preferably in the form of a tapering pit. At the top of the pit is the cylindrical ring B, extending down into the pit a suitable distance and provided at its lower edge with an inwardly-projecting horizontal flange B', which latter rests solidly on the foundation and forms the seat on which the carriage rests. The ring B is adapted to receive the carriage and support it solidly on all sides, while the flange B', which, as before stated, projects inwardly under the carriage, receives part of the weight of the carriage when the carriage is in its depressed or lowered position and the gun in its elevated position, as shown in Fig. 2. When the parts are in the positions last described, which are the positions for firing, the carriage is on a solid foundation when the great initial force of the recoil takes place, the gun, however, resting on yielding bearings, which receive the energy of recoil, as will be hereinafter explained.

Located within the bottom of the pit is the base-plate C, provided centrally with a cylinder C', adapted to receive the plunger D, depending from the under side of the carriage E at the center thereof. The plunger is suitably packed to prevent the escape of the fluid contained in the cylinder, and is provided with a longitudinal bore through which fluid is forced from the hydraulic cylinders F, located at the bottoms of the trunnion-slides.

The carriage is circular in form and is preferably composed of a central section and two side sections, as shown in Figs. 3 and 4, securely bolted together. The central section supports the gun and is concaved or dish-shaped on top to receive the breech end of the gun during the recoil. The trunnions of the mortar are supported in boxes $a$, mounted in slides $b$, located at an inclination or angle, as shown. The slides are formed on the inner faces of two similarly-inclined castings firmly and securely mounted at their bases to the top of the carriage E. At the lower end of each slideway and preferably in line therewith is the cylinder F, which receives the plunger G, carrying a box $a$. The two boxes $a$, with their plungers G, are adapted to move throughout the length of the slideways and are held normally in elevated position by a body of fluid contained in cylinders F. Both cylinders are connected by pipes with the bore of plunger D for the passage of water, oil, or other fluid used from the cylinders F into the cylinder C', and between the cylinder C' and the cylinder F and preferably at the juncture of the two pipes with the bore of plunger D is located a check-valve $A^2$, which permits of the free passage of the fluid from cylinders F into cylinder C', but prevents the passage of the fluid in the opposite direction. With the cylinders empty the carriage would rest on the ring B B' and the boxes would be in about the position shown in Fig. 1. If a fluid be now forced into cylinders F, it will fill the space in the cylinders F and C' not occupied by the plungers C and D. If after the vacant spaces have been filled fluid under pressure be forced into cylinders F, the plungers G and the gun carried thereby will be elevated until the boxes $a$ occupy the upper ends of the slideways, and when in this position and with the cylinders thus filled the gun is ready for action. The weight of the gun is borne by the fluid in the cylinders F, and the force of the recoil will be taken up by the resistance offered to the passage of the fluid from the cylinders F into the cylinder C'. As the gun is fired the recoil causes the plungers G to move downwardly in their respective cylinders and necessarily forces the fluid in cylinders F through pipes H and plunger D into cylinder C', and the fluid entering cylinder C' under plunger D operates to elevate the carriage to the position shown in Fig. 1, and while in this elevated position it is supported on a fluid bearing or pivot on which it can be readily and quickly turned to any position desired. The gun when in its lowered position is now ready for reloading, after which it is elevated to its normal position or position for firing by the energy stored during the recoil of the gun.

As before stated, the check-valve $A^2$ absolutely prevents the passage of the fluid from cylinder C' up to the cylinders F. Hence, in order to utilize the energy stored in the cylinder C', it is necessary to provide a passage for the fluid from cylinder C' back to the cylinders F. As soon as such passage-way is established, it will be seen that the weight of the carriage, which is now in an elevated position, causes the plunger D to descend in cylinder C' and force the displaced fluid up into cylinders F, and as the carriage and weight carried thereby is heavier than the gun the plungers carrying the latter must move outwardly in cylinders F to make way for the fluid displaced in cylinder C'. The return of the fluid from cylinder C' to cylinder F is accomplished by means of the by-pass pipes $d$, one branch of said pipe being connected to bore of plunger D below check-valve $A^2$ and the other branch or end connected to pipe H above the check-valve, the said by-pass pipe being provided with a valve $d'$, adapted normally to close said by-pass pipe and prevent the return of the fluid, but actuated by lever $d^2$ when it is necessary to open the passage-way for the return of the fluid. Thus it will be seen that upon the discharge of the gun the force of the recoil forces the fluid from cylinders F into cylinder C' and operates to elevate the carriage above its seat, so that it can be turned to any position desired, and by simply operating valve $d'$ in the by-pass pipe the fluid in cylinder C', which is supporting the weight of the carriage and gun, is forced up into cylinders F, causing the plungers therein to make way for the fluid displaced in cylinder C'. By means of the valve $d'$ the elevation of the gun and lowering of the carriage can be accomplished at any desired speed.

The inner edge of flange B' of the ring B is provided with teeth $e$, which are engaged by toothed wheel $e'$, carried by the vertical shaft $e^2$. The wheel $e'$ is considerably longer than the teeth $e$, so that it is in engagement therewith both in the normal and elevated positions of the carriage, and the shaft $e^2$, to which said wheel is secured, is mounted in bearings secured to the casting, which support or form slideways for the trunnions $a$. On the upper end of shaft $e^2$ is a bevel-pinion $e^3$, which is engaged by a bevel-pinion $e^4$, carried on crank-shaft $e^5$. By actuating shaft $e^5$ the carriage can be turned to any position desired, and as the carriage, when in position to be turned, is supported on a fluid bearing it follows that but slight power, comparatively speaking, is required to move the carriage.

In the modification shown in the drawings the position of the cylinder and plunger under the carriage are reversed—that is to say, the cylinder instead of being attached to the plate C is integral with or rigidly secured to the carriage and the plunger is seated in a concave bearing formed on plate C. With this construction one end of the by-pass pipe enters the cylinder while the opposite end engages pipes H above the check-valve.

It will be seen at a glance that instead of employing two cylinders F with a plunger for each cylinder the two plungers can be joined at their lower ends by a cross-head carrying a centrally-located plunger adapted to operate in a single cylinder located, preferably, in a central line between the two slideways, and hence when we employ the term "cylinders" in the claims we intend it to comprehend two plungers and a single cylinder.

It is evident that numerous slight changes in the construction and arrangement of the several parts of the device might be made without departing from the spirit of the invention. Hence we would have it understood that we do not confine ourselves to the exact construction shown and described, but consider ourselves at liberty to make such changes and alterations as fairly fall within the spirit and scope of our invention.

Having fully described our invention, what we claim as new, and desire to secure by Letters Patent, is—

1. The combination, with a base or support, a carriage resting thereon, a gun, upper plungers supporting the gun and adapted to be moved by the recoil thereof, and hydraulic cylinders in which said upper plungers move, of a cylinder and plunger located below the carriage, and fluid passage-ways between the upper and lower cylinders, substantially as set forth.

2. The combination, with a base or support, a carriage resting thereon, and a gun mounted on the carriage, the said gun being normally above the base or support and the said carriage being laterally supported at all times by the base, of means for elevating the carriage, and devices for turning the carriage while thus elevated.

3. The combination, with a base or support, a carriage normally resting thereon, a gun, upper plungers supporting the gun, and hydraulic cylinders in which said upper plungers move, of a cylinder and plunger located below the carriage and adapted to support same when in an elevated position, the said last-mentioned cylinder adapted to receive the fluid displaced by the upper plungers for elevating the carriage, substantially as set forth.

4. The combination, with a carriage, a gun located thereon, upper plungers for supporting the gun and adapted to be actuated by the recoil of the gun, and hydraulic cylinders in which said upper plungers move, of a cylinder and plunger located below the carriage, fluid passage-ways between the upper and lower cylinders, and a check-valve in said passage-way for preventing a return of the fluid to the upper cylinders, substantially as set forth.

5. The combination, with a carriage, a gun located thereon, upper plungers in operative connection with said gun and adapted to be actuated by the recoil of the gun, and hydraulic cylinders in which said upper plungers move, of a cylinder and a plunger located below the carriage, fluid passage-ways between the upper and lower cylinders, a check-valve in said passage-way for preventing a return of the fluid to the upper cylinders, a by-pass pipe or shunt around said valve, and a valve in said by-pass or shunt, substantially as set forth.

6. The combination of a gun-carriage carrying cylinders, plungers actuated by the recoil of the gun, and a cylinder and plunger located below the carriage, the said cylinders having therein a fluid under pressure and so connected that when the plungers which are actuated by the recoil of the gun are forced into their cylinders the fluid in said cylinders is forced into the lower cylinder and the carriage elevated above its seat, and when the lower cylinder is opened for the escape of the fluid therein the weight of the elevated carriage forces the fluid in said lower cylinder into the upper cylinders, thereby elevating the gun, substantially as set forth.

7. The combination, with a ring having an inwardly-projecting horizontal flange, of a gun-carriage seated within the ring and resting on the flange, a cylinder and plunger located below the carriage, and means actuated by the recoil of the gun for forcing a liquid into the cylinder, substantially as set forth.

8. The combination, with a gun-carriage and a support therefor, of a hydraulic cylinder and plunger located below the carriage, hydraulic devices supporting the gun and adapted to receive the force of the recoil, and passage-ways between the hydraulic devices which receive the force of the recoil, and the hydraulic cylinder below the carriage, whereby the fluid which receives the impact is forced into the cylinder below the carriage and elevates said carriage above its support, substantially as set forth.

In testimony whereof we have signed this specification in the presence of two subscribing witnesses.

THOS. R. MORGAN, Sr.
JOHN R. MORGAN.
THOMAS R. MORGAN, Jr.
WILLIAM H. MORGAN.

Witnesses:
FRANK E. DUSSEL,
A. W. BRIGHT.